United States Patent
Mills et al.

(10) Patent No.: US 12,542,892 B2
(45) Date of Patent: Feb. 3, 2026

(54) INTEGRITY MONITORING OF IMAGE SENSOR DATA

(71) Applicant: BAE SYSTEMS plc, London (GB)

(72) Inventors: Colin Richard Mills, Rochester (GB); Richard David Harriss, Rochester (GB)

(73) Assignee: BAE SYSTEMS PLC, London (GB)

( * ) Notice: Subject to any disclaimer, the term of this patent is extended or adjusted under 35 U.S.C. 154(b) by 8 days.

(21) Appl. No.: 18/694,031

(22) PCT Filed: Jun. 22, 2022

(86) PCT No.: PCT/GB2022/051587
§ 371 (c)(1),
(2) Date: Mar. 21, 2024

(87) PCT Pub. No.: WO2023/047074
PCT Pub. Date: Mar. 30, 2023

(65) Prior Publication Data
US 2024/0430402 A1    Dec. 26, 2024

(30) Foreign Application Priority Data

Sep. 21, 2021   (EP) .................................... 21275132
Sep. 21, 2021   (GB) .................................... 2113467

(51) Int. Cl.
*H04N 17/00*    (2006.01)
*H04N 25/68*    (2023.01)

(52) U.S. Cl.
CPC ........... *H04N 17/002* (2013.01); *H04N 25/68* (2023.01)

(58) Field of Classification Search
CPC ...... H04N 17/002; H04N 25/68; H04N 23/90; H04N 25/633; G09G 2330/12; G09G 2380/12
See application file for complete search history.

(56) References Cited

U.S. PATENT DOCUMENTS

| 6,661,456 B1 | 12/2003 | Aufrichtig et al. |
| 9,785,231 B1 | 10/2017 | Zimmerman et al. |

(Continued)

FOREIGN PATENT DOCUMENTS

| EP | 0997845 A2 | 5/2000 |
| EP | 1892670 A2 | 2/2008 |

(Continued)

OTHER PUBLICATIONS

International Search Report and Written Opinion received for PCT/GB2022/051587 Mailed: Mar. 9, 2023. 18 pages.

(Continued)

*Primary Examiner* — Michael Lee
(74) *Attorney, Agent, or Firm* — Finch & Maloney PLLC

(57) ABSTRACT

An integrity monitor for monitoring integrity of image sensor data. The integrity monitor comprises an image sensor configured to generate image sensor data, wherein the image sensor data includes an image representative of a scene and a plurality of optically dark pixels in a predetermined position relative to the image. The integrity monitor further comprises a controller configured to: analyse (403) one or more characteristics of at least one of the plurality of optically dark pixels; and determine (405) a presence of a fault in the image sensor data based at least in part on the one or more characteristics of the at least one of the plurality of the optically dark pixels to be output to enable mitigation of the fault.

19 Claims, 4 Drawing Sheets

(56) References Cited

U.S. PATENT DOCUMENTS

| | | | |
|---|---|---|---|
| 2005/0062862 A1* | 3/2005 | Matsuyama | H04N 25/633 348/E5.081 |
| 2008/0055601 A1* | 3/2008 | Ovsiannikov | H04N 25/69 348/E5.081 |
| 2011/0013855 A1* | 1/2011 | Ise | H04N 25/677 382/275 |
| 2011/0298945 A1 | 12/2011 | Chen et al. | |
| 2013/0027565 A1 | 1/2013 | Solhusvik et al. | |
| 2017/0126999 A1* | 5/2017 | Elikhis | H04N 25/68 |

FOREIGN PATENT DOCUMENTS

| | | | |
|---|---|---|---|
| GB | 2568296 A | | 5/2019 |
| JP | 2011130217 A | * | 6/2011 |
| JP | 2012100070 A | * | 5/2012 |
| WO | 2023047074 A1 | | 3/2023 |

OTHER PUBLICATIONS

GB Combined Search and Examination Report under Sections 17 and 18 (3) received for GB Application No. 2113467.1, dated Jun. 15, 2022. 16 pages.
Extended European Search Report received for EP Application No. 21275132.5, dated May 13, 2022. 17 pages.
European Search Report received for EP Application No. 21275132.5, dated Feb. 22, 2022. 16 pages.
Invitation to Pay Additional Fees, and, where applicable Protest Fee received for PCT/GB2022/051587 Mailed: Sep. 12, 2022. 13 pages.

\* cited by examiner

INTEGRITY MONITORING OF IMAGE SENSOR DATA

FIELD

The present invention relates to integrity monitoring and, in particular but not exclusively, to integrity monitoring of an image sensor data from an image sensor.

BACKGROUND

Avionic displays, in particular those required to display safety-critical information, are required to operate with a very high level of integrity and to have been developed to very high standards associated with integrity. Certification of such systems may be very expensive and time-consuming. For example, an optical stimulus can be injected into the display system to determine a fault in the system and monitor the integrity of image sensor data.

SUMMARY

The invention is defined by the features of the appended claims.

According to an aspect of the present invention there is provided an integrity monitor for monitoring integrity of image sensor data. The integrity monitor comprises an image sensor configured to generate image sensor data, wherein the image sensor data includes an image representative of a scene and a plurality of optically dark pixels in a predetermined position relative to the image; and a controller configured to: analyse one or more characteristics of at least one of the plurality of optically dark pixels and determine a presence of a fault in the image sensor data based at least in part on the one or more characteristics of the at least one of the plurality of the optically dark pixels to be output to enable mitigation of the fault.

In this way, the optically dark pixels are maintained and used instead of being cropped or discarded prior to or during transmission of the image sensor data. As a result, the integrity of the image sensor data is verified and results in providing only the image sensor data with a high integrity for use. This simplifies the process of integrity tests and computations.

Preferably, the controller is further configured to output a result of the determination of the presence of a fault in the image sensor data.

Preferably, the controller is further configured to output the image sensor data, in response to determining that the presence of a fault in the image sensor data is at an acceptable level. In this way only the image sensor data that has passed the integrity test is output.

Preferably, the integrity monitor further comprises a display configured to display the image sensor data without the plurality of optically dark pixels to a user. In this way, only the main image, which is the most relevant image for performing an action is displayed. Alternatively, the integrity monitor further comprises a display configured to display the image sensor data with the plurality of optically dark pixels to a user. In this way, only the necessary high integrity data are sent to the user. The user then interacts with the image sensor data, and where appropriate takes an action. Depending on the system requirements or design requirements, the plurality of optically dark pixels may be displayed or not, providing flexibility to the system design and operability.

Preferably, the controller is configured to output a signal to cause or to perform an action to mitigate the fault in the image sensor data in response to the determination of the presence of a fault in the image sensor data. The action may comprise one or more of: disregarding the image sensor data, providing a replacement image sensor data, delaying the displaying of the image sensor data, maintaining current operation of the vehicle, alerting the fault in the system to the user and/or the systems of the vehicle. In this way, the system prevents misleading image sensor data being used for further processing and/or for displaying. By preventing unnecessary processing of erroneous image sensor data, processing cost is saved. By preventing display of erroneous image sensor data, a potential causation of a potential critical error is eliminated. By preventing use of the erroneous image sensor data, a potential causation of a potential critical error is eliminated.

Preferably, the controller is configured to blend at least one of a symbology or a second image sensor data to the image sensor data. A further reference pixel is incorporated into the process by including the symbology or the second image sensor data to the image sensor data for an integrity testing. The reference pixel may comprise one or more pixels. The one or more pixels may form a pattern. In this way, the integrity testing is enhanced.

Preferably, the controller is further configured to sample one or more pixels of the image sensor data. The controller is further configured to perform at least one of: comparing a grayscale level of the sampled one or more pixels with the grayscale level of the at least one of the plurality of optically dark pixels or contrasting the sampled one or more pixels against at least one of the plurality of optically dark pixels. In this way, the method of integrity testing is simplified. Any one of selected pixels of the image sensor data is compared with the grayscale level of any one of the plurality of optically dark pixels that forms a border. Preferably, the one or more characteristics of the at least one of the plurality of optically dark pixels comprises at least one of: a position of at least one of the plurality of optically dark pixels or a signal level of at least one of the plurality of optically dark pixels.

Preferably, the controller is configured to determine a border formed of the plurality of optically dark pixels. The controller is further configured to: analyse one or more characteristics of the border; and determine the presence of a fault in the image sensor data based at least in part on the one or more characteristics of the border to be output to enable mitigation of the fault.

Preferably, the one or more characteristics of the border comprises at least one of: a position of the border, a size of the border or one or more signal levels in the border.

According to a further aspect of the present invention there is provided a method for monitoring integrity of image sensor data. The method comprises: receiving image sensor data, wherein the image sensor data includes an image representative of a scene and a plurality of optically dark pixels in a predetermined position relative to the image; analysing one or more characteristics of at least one of the plurality of optically dark pixels; and determining a presence of a fault in the image sensor data based at least in part on the one or more characteristics of the at least one of the plurality of the optically dark pixels to be output to enable mitigation of the fault.

Preferably, the method further comprises outputting a result of the determination of the presence of a fault in the image sensor data Preferably, the method further comprises outputting the image sensor data, in response to determining that the presence of a fault in the image sensor data is at an acceptable level.

Preferably, the method further comprises displaying the image sensor data with the plurality of optically dark pixels to a user. Preferably, the method further comprises displaying the image sensor without the plurality of optically dark pixels to a user.

Preferably, the method further comprises performing an action to mitigate the fault in response to the determination of the presence of a fault in the image sensor data. Preferably, the action comprises one or more of: disregarding the image sensor data; providing a replacement image sensor data; delaying the displaying of the image sensor data; maintaining current operation of the vehicle; and alerting the fault in the system to the user and/or the systems of the vehicle.

Preferably, the method further comprises blending at least one of a symbology or a second image sensor data to the image sensor data.

Preferably, determining the presence of a fault in the image sensor data comprises sampling one or more pixels of the image sensor data; and further comprises at least one of: comparing a grayscale level of the sampled one or more pixels with the grayscale level of at least one of the plurality of optically dark pixels or contrasting the sampled one or more pixels against at least one of the plurality of optically dark pixels. In this way, accuracy of the process is improved. Also, in this way, the sampling provides potentially time related information by looking at the adjacent pixels.

Preferably, the one or more characteristics of the at least one of the plurality of optically dark pixels comprises at least one of: a position of at least one of the plurality of optically dark pixels and comparing a position of the at least one of the plurality of optically dark pixels of a first frame of the image sensor data with a position of the at least one of the plurality optically dark pixels of a second frame of the image sensor data; or a signal level of at least one of the plurality of optically dark pixels and comparing the signal level of the at least one of the plurality of optically dark pixels with a signal level of one or more of the pixels of the image.

Preferably, the method further comprises: determining a border formed of the plurality of optically dark pixels; and further comprises: analysing one or more characteristics of the border; and determining the presence of a fault in the image sensor data based at least in part on the one or more characteristics of the border to be output to enable mitigation of the fault.

Preferably, the one or more characteristics of the border comprises at least one of: a position of the border and comparing the position of the border of a first frame of the image sensor data with a position of the border of a second frame of the image sensor data; a size of the border comparing the size of the border of a first frame of the image sensor data with a size of the border of a second frame of the image sensor data; or one or more signal levels in the border and comparing the one or more signal levels in the border with one or more signal levels of the image.

According to a further aspect of the present invention there is provided a vehicle comprising an integrity monitor as described in the preceding paragraphs.

According to a further aspect of the present invention there is provided a computer-readable storage medium comprising instructions that, when executed, cause one or more processors to perform the method for monitoring an integrity of an image sensor data according to the preceding paragraphs.

BRIEF DESCRIPTION OF THE FIGURES

Embodiments of the invention will now be described, by way of example only with reference to the figures, in which.

DETAILED DESCRIPTION

Figure 1:
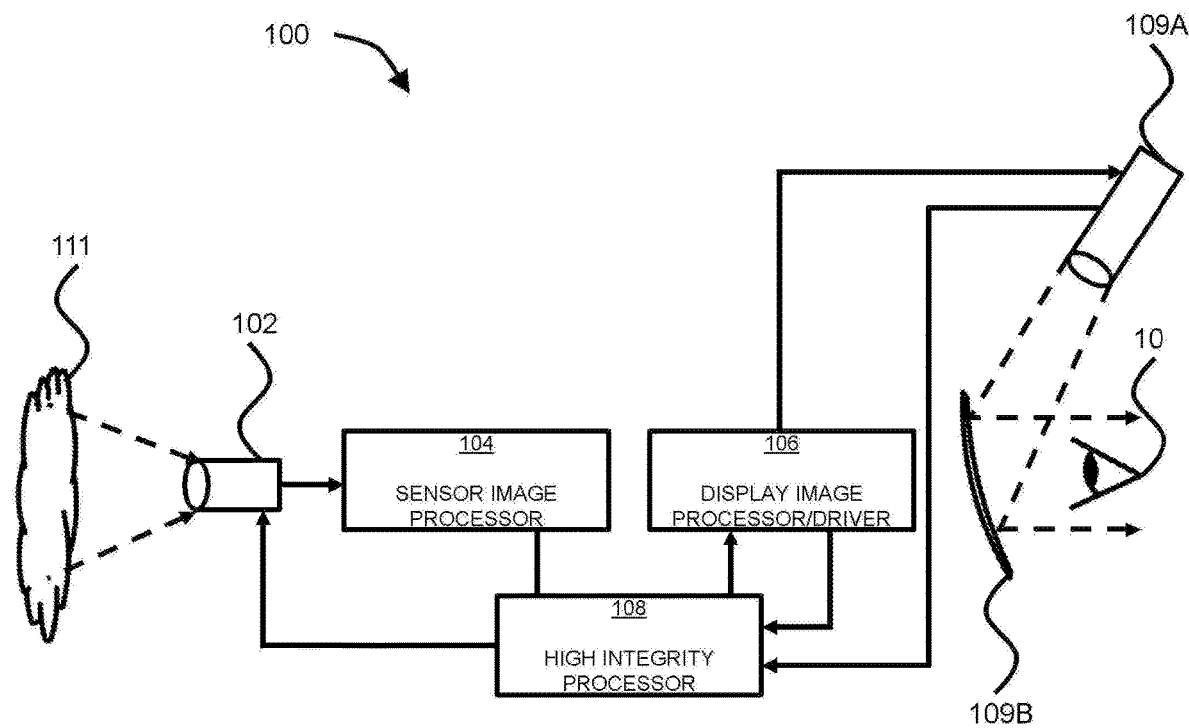
FIG. 1 is a diagram showing a display system for monitoring integrity of image sensor data.

The present invention relates to integrity monitoring. In the following detailed description, references are made to the accompanying drawings that form a part hereof, and which are shown by way of illustration of specific configurations or examples. Referring now to the drawings, in which like numerals represent like elements throughout the several FIGS.

In certain situations, a safety-critical information needs to be delivered to a system or a user to very high standards. For example, the image sensor data whether being displayed to a user, such as pilot or a driver of a vehicle, or being sent to automated system for various vehicles, needs to maintain high integrity. The term "vehicle" is used to refer to an aircraft, a spacecraft, a naval vessel, or any vehicle operable on terrains.

Certification of avionic displays, in particular those required to display safety-critical information, requires evidence of development to very high standards of integrity and operation to a very high level of integrity. Acceptable integrity levels for an application vary depending on the application and the purpose of the application. For example, for the purpose of the application in relation to the invention described in this disclosure, the safety integrity level aimed to be achieved is at least in the range of 10-7 to 10-9 probability of presenting misleading information from a sensor image. The safety integrity level that may be aimed to be achieved is less than 10-8 probability of presenting misleading information from a sensor image. The safety integrity level that may be aimed to be achieved is less than 10-9 probability of presenting misleading information from a sensor image.

Examples of an integrity monitoring is described below in an example application display system. In a particular example but not limited to, the integrity monitor will be described for monitoring the integrity of a display system arranged to display images output by a night vision camera (NVC). The present invention is not limited to an application on display systems only. The integrity monitoring may form a part of advanced driver assistance systems or automated systems. Also, the integrity monitoring may be applied to any form of image sensors that generates an optically dark reference border, such as complementary metal-oxide-semiconductor (CMOS) image sensors, charge-coupled devices (CCDs), electron bombarded active pixel sensor (EBAPS) etc. In particular, any solid-state image sensors that include a set of "dark reference" pixels may apply the described integrity monitor.

Examples of integrity failures or other safety hazards that may be detected include: a frozen display; image scaling errors; image oscillation; positioning errors; image brightness faults; content of the image not matching the expected content; and pixels synchronisation errors. Examples of the display types in which such failures or hazards may be detected include but are not limited to head-up displays (HUDs), head-down displays (HDDs) and head-mounted displays (HMDs). Images displayed by such systems may be output by display devices such as digital micro-mirror devices (DMDs), liquid crystal on silicon (LCoS) devices, organic light-emitting diode (OLEO) devices or other digital display device types.

FIG. 1 is a diagram showing a display system for monitoring an integrity of an image sensor data. FIG. 1 illustrates an example head-mounted display system 100 that incorporates an integrity monitoring according to an embodiment of the invention.

The display system comprises a head-mounted display system 100 comprising a camera 102 for sensing an external scene 111 via an image sensor. The image sensor may be any standard image sensor. The image sensor may be a part of specialised camera. For example, the camera may be a night vision camera (NVC) for sensing an external night-time scene. The image sensor may comprise a night vision image sensor. The head-mounted display system 100 may be a helmet-mounted display system.

The display system further comprises a sensor image processor 104, a display image processor/driver 106 and an image projector 109A. The image projector 109A is arranged to project an image towards and for reflection by a partially reflective visor 109B for viewing by a user 10.

In such a display system, failures may occur due to component failures or latent design failures in any one of the components 102, 104, 106, 109A and 109B leading to a potentially hazardous situation. An integrity monitoring is incorporated to work with the display system for the purpose of detecting such failures without interfering with the generation and display of images to the user 10. Additionally, or alternatively, the integrity monitoring may be incorporated to work with the display system for the purpose of automated or advanced driver/pilot assisted operation of the vehicle. In use for such purpose, the integrity monitoring is incorporated to work with any one of computing systems on the vehicle for the automated or advanced driver/pilot assistant operation.

Figure 3:
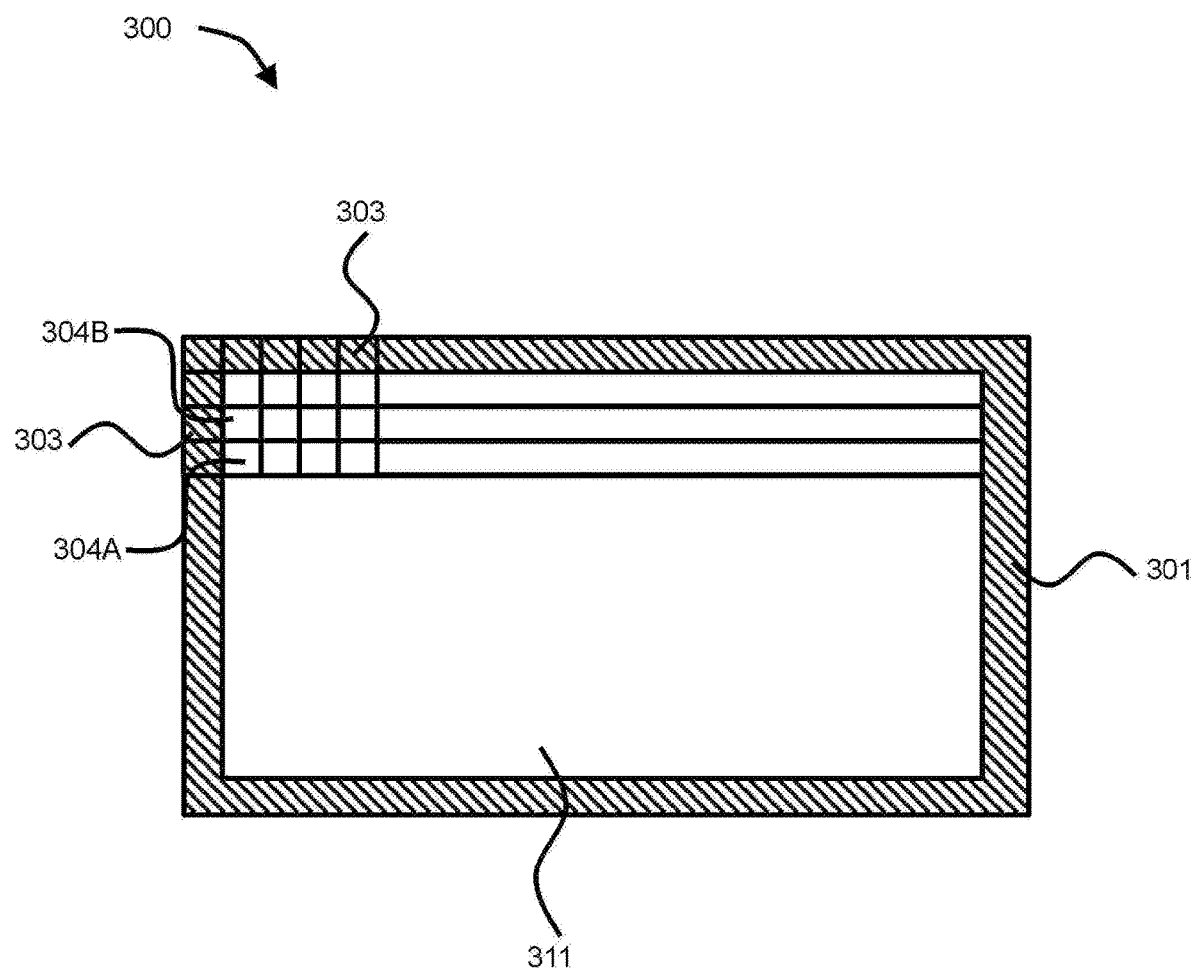
FIG. 3 shows a schematic diagram of an image and pixels.

The display system comprises a controller configured to implement integrity monitoring process. The controller comprises a high integrity processor 108. Additionally, or alternatively, the controller configured to implement integrity monitoring process may be a sensor image processor 104 or a display image processor 106. It is to be understood that the controller(s) described herein can each comprise a control unit or computational device having one or more electronic processors. The controller is configured to receive image sensor data from the image sensor. The image sensor data includes an image representative of a scene. The image sensor is configured to capture the external scene 111. The image sensor data comprises a plurality of optically dark pixels 303. These optically dark pixels are dark reference pixels. These optically dark pixels may be used as black reference by the NVC algorithms to optimise the optical performance of the image sensor. The optically dark pixels are created around the image (e.g. scene 111) being captured by the image sensor. The controller is configured to analyse one or more characteristics of at least one of the plurality of the optically dark pixels 303 (as illustrated in FIG. 3). The analysis may be carried out by using machine learning algorithms or by any other image processing algorithms. Each of the optically dark pixels comprises a "gray" shade (i.e. a non-zero value). Each of the optically dark pixels may comprise a value. The value of each of the optically dark pixels may fluctuate depending on external influences (for example but not limited to, temperature). The value of each of the optically dark pixels may comprise slight offsets and exhibit small levels of noise when monitoring from frame to frame. These slight offsets and small levels of noise may be tolerated by the integrity monitor and considered as an acceptable level of fault in the image sensor data. In some examples, each of the optically dark pixels may comprise a value that is a predetermined percentage of the maximum signal value. For example, each of the optically dark pixels may comprise a value that is 5% of the maximum signal value.

The controller is configured to calibrate the image sensor. During calibration of the image sensor there is a level of correction that is applied to the sensor image data.

The controller is configured to determine a presence of a fault in the image sensor data based on at least in part on the one or more characteristics of the of the plurality of optically dark pixels 303. The one or more characteristics of the at least one of the plurality of optically dark pixels 303 comprises at least one of: a position of at least one of the plurality of optically dark pixels 303, a signal level of at least one of the plurality of optically dark pixels 303. The signal level refers to the content signal level of a pixel. The signal level is indicative of one or more of: a brightness or intensity of a pixel, a noise level in a pixel, and/or a greyscale level of a pixel.

The one or more characteristics of the at least one of the plurality of optically dark pixels 303 may comprise a signal level, and the determining of a presence of a fault in the image sensor data comprises comparing the signal level of the at least one of the plurality of optically dark pixels 303 with a signal level of one or more of the pixels 304A, 304B of the image 311.

The controller is configured to determine whether the signal level of the pixels in a line or a column are higher or lower, depending on the nature of the measured value, than the optically dark pixels for the line or the column. A minimum and/or a maximum threshold value is calculated for each line/column based on the signal level value of the optically dark pixels. Each active pixel in the line/column is checked to ensure that the pixel being checked exceeds the calculated threshold. For example, if the signal level is indicative of a brightness of pixels, a minimum brightness threshold is calculated for each line/column based on brightness signal level of the optically dark pixels. Each active pixel in the line/column is determined whether it the pixel being compared exceeds the minimum brightness threshold. Alternatively, or additionally, the controller is configured to profile a line or a column. This profile is used to check for a gradient response at a transition from the optically dark pixels to the active pixels of the image sensor data. This profile is also used to check for a gradient response at a transition from the active pixels to the optically dark pixels. When all adjacent active pixels and the optically dark pixels inspected by the controllers match the expected border profile then no error is detected and there is no presence of a fault. Alternatively, or additionally, the controller is configured to buffer the whole image and to then search for a certain number of darkest pixels and check that they are all confined to the border region. The controller is configured to use image kernel filters to search for gradients at the edge of the images, line buffers to buffer entire lines of the pixels, and/or frame buffers to buffer entire frame of the image sensor data. Using these methods, the controller is able to determine shifted (such as horizontally and/or vertically shifted), incorrectly scaled or missing pixels/lines for a whole sensor image.

When determining a presence of a fault, the controller determines a number of pixels that are shifted. The controller obtains the number of shifted pixels, in particular, for determining gradients at the edge of the image. Additionally, or alternatively, when determining a presence of a fault, the controller determines the number of pixels that failed to meet the set threshold value in a line/column. The controller the number of failed pixels, in particular, for determining the signal level of pixels such as brightness of the pixels. The allowed number of failed pixels is set to be less than the number of dark pixels in the line/column. This ensures that the check can be carried out efficiently. The controller is also configured to map these defective pixels to allow them to be excluded from the checks. A map of defective pixels is created when the camera is initialised and/or calibrated. The controller is configured to set an acceptable/tolerance level of the faults. This acceptable level of the faults may be based on the allowed number of failed pixels and/or shifted pixels. The acceptable faults may comprise a degradation caused by slight anomalies. For example, there may be expected tolerance in the alignment of the pixels. The acceptable faults may comprise a degradation caused by a limited number of sensor frames failing the test. The controller may filter these frames out as there is typically between 0.5 and 1 second to report an integrity failure for a pilot display.

Additionally, or alternatively, the one or more characteristics of the at least one of the plurality of optically dark pixels 303 may comprise a position of the at least one of the plurality of optically dark pixels 303, and the determining of a presence of a fault in the image sensor data comprises comparing a position of the at least one of the plurality of optically dark pixels 303 of a first frame of the image sensor data with a position of the at least one of the plurality of optically dark pixels 303 of a second frame of the image sensor data. The image sensor data may comprise one or more frames 300. A frame may be selected within a predetermined period of time, such as 20 ms. The controller is configured to directly compare the expected location of pixels and the co-location of active pixels against the optically dark pixels.

Additionally, or alternatively, a border 301 is formed from the plurality of optically dark pixels of the image sensor data. The controller may be configured to recognise forming of a border 301 comprising the plurality of the optically dark pixels. The controller may be configured to create a border 301. The controller may be configured to create the border 301 with a subset of the plurality of the optically dark pixels. The border 301 corresponds to one or more edges of the image sensor data. The one or more edges of the image sensor data are defined by one or more edges of the camera 102. The border 301 is formed along one or more edges of the image 311. The border 301 may enclose the image 311 of the image sensor data. The controller is configured to analyse one or more characteristics of the border 301. The controller is configured to analyse one or more characteristics of two or more the plurality of the optically dark pixels 303 that forms the border 301 relative to each other.

The controller is configured to determine a presence of a fault in the image sensor data based on at least in part on the one or more characteristics of the border 301. The one or more characteristics of the border 301 comprises at least one of: a position of the border, a size of the border or one or more signal levels in the border. The image sensor data may comprise one or more frames 300. A frame may be selected within a predetermined period of time, such as 20 ms. Each frame includes an image 311 and a border 301. The one or more characteristics of the border may comprise one or more signal levels, and the determining of a presence of a fault in the image sensor data further comparing the one or more signal levels of the border with one or more signal levels of the image 311. The signal level comparison steps description above with reference to the at least one of the optically dark pixels applies and are carried out by the controller in the same manner using the one or more signal levels of the border and the one or more signal levels of the image. Additionally, or alternatively, the one or more characteristics of the border 301 comprises a position of the border, and the determining of a presence of a fault in the image sensor data further comprises comparing the position of the border with a position of the border in a first frame of the image sensor data. The border position is fixed. The border position is based on physical features of the sensor. The border position is expected to substantially match the fixed position on every frame. The position of the border is encoded into the algorithms and used to perform the checks for any transient faults. In some examples a certain number of failing frames may be allowed, so long as the fault clears. For example, 30 failed frames in every 300 frames is acceptable and 0.5 second of faults in any 5 second period for a 60 Hz video system is acceptable.

In some examples, the controller is configured to determine a reference border for the pixels. This determination is made during calibration of the system. The controller stores information of the determined reference border, such as the position of the reference border, independent from the sensor. The information of the reference border may be stored in a helmet for a pilot. The one or more characteristics of the border 301 comprises a position of the reference border and the determining of a presence of a fault in the image sensor data further comprises reading out a plurality of pixels comprising the border and their adjacent pixels in the reference border and each frame of the image sensor data and comparing these pixels. If there is sufficient time then the controller is configured to process all the pixels for every frame of the image sensor data. If the processing time is insufficient, then the controller is configured to read out different pixels to build up the "integrity" picture over selected number of frames. The number of frames is based on the processing time and the time tolerance in reporting a fault. Typically, the time tolerance is 0.5 to 1 second.

Additionally, or alternatively, the one or more characteristics of the border 301 comprises a size of the border, and the determining of a presence of a fault in the image sensor data further comprises comparing the size of the border with a size of a border of the image. The same operations in relation to determining and using the position of the border for determining the presence of faults described above apply to determining and using the size of the border for the same purpose. The border size is fixed. The border size is based on physical features of the sensor. The border size is expected to substantially match the fixed size on every frame. The size of the border is encoded into the algorithms and used to perform the checks for any transient faults. The one or more characteristics of the border 301 may comprise the one or more characteristics of the at least one of the optically dark pixels 303. Alternatively, the one or more characteristics of the at least one of the optically dark pixels 303 may include the information about the border 301.

The controller is configured to output a result of the determination of the presence of a fault in the image sensor data. If the controller is configured to detect a fault in the image sensor data, then the controller is configured to output a signal indicative of the presence of the fault. The signal indicative of the presence of the fault may include the information whether the presence of the fault is at an acceptable and/or tolerable level or not. Alternatively, or additionally, if the controller is configured to not detect only an acceptable and/or tolerable fault in the image sensor data, then the controller is configured to outputs a signal indicative of the presence of the fault at an acceptable and/or tolerable level. In some examples, the controller is configured to output the image sensor data, in response to determining that the presence of a fault in the image sensor data is at an acceptable and/or tolerable level. The acceptable level of fault is configured in response to the accuracy requirement of the system. The acceptable level of fault comprises an absence of the faults. The controller is configured to tolerate a transient fault. The transient fault may be referred to the fault that occurred during operations but is capable of being cleared before outputting the image sensor data. The presence of a fault in the image sensor data is at an acceptable and/or tolerable level if the fault (for example, the transient fault) clears after a predetermined period. The predetermined period may be a frame refreshing rate. For example, the predetermined period may be 0.5 seconds. In some examples, single pixel (or small area) faults may be tolerated as long as a gross deformation of the image sensor data that can provide hazardously misleading information is not generated. In some examples, if a shift occurs for a readout (for example, a line by a pixel shift occurs during a readout) and the shift is transitory then the likelihood of presenting misleading information is mitigated as it is refreshed frame by frame. Therefore, the system may tolerate a small or transitory variation of the readout of the optically dark pixels. The image sensor data with acceptable level and/or tolerable level of fault may pass the integrity test. If the controller is configured to not detect any fault in the image sensor data, then the controller is configured to output a signal indicative of the absence of the fault. In some examples, the controller is configured to output the image sensor data, in response to determining an absence of a fault in the image sensor data. If the image sensor data passes the integrity test, then the controller is configured to allow output of the image sensor data.

In such case, the display system 100 displays the image sensor data to a user 10 via the image projector 109A and the visor 109B. The image sensor data may be displayed without the border 301. The border 301 is generated upon receiving the image sensor data from the image sensor. The border 301 is captured when the image sensor captures the scene 111. The border 301 corresponds to the edges of the image sensor. The border 301 corresponds to the edges of the camera. In some examples, the border is carried throughout the process prior to the display of the image sensor data. Information on the border 301 is carried throughout the process prior to the use of the image sensor data. When the image sensor data is called upon to be display the controller crops the image sensor data to remove the border 301. The controller is configured to output a signal to cause an action to mitigate the fault in the image sensor data. Additionally, or alternatively, the controller is configured to perform an action to mitigate the fault in the image sensor data. In response to the determination of the presence of a fault in the image sensor data, the controller is configured to output a signal to cause or perform an action to mitigate the fault and to prevent a usage of the image sensor data. The presence of a fault here refers to that the fault is at an unacceptable level and/or at an intolerable level, and/or not a transient fault. Upon detection of a failure or other hazardous mode of operation, the integrity monitoring may trigger an action. The action comprises one or more of: disregarding the image sensor data, providing a replacement image sensor data, delaying the displaying of the image sensor data, maintaining current operation of the vehicle, alerting the fault in the system to the user and/or the systems of the vehicle. The action of alerting the fault in the system to the user may comprise blanking of the display with a warning message or flagging up any issue to the user to address faulty image sensor data. The action may be carried on for a predetermined period of time. The controller may be configured to disable the display system 100 within a predetermined time period. For example, the controller may be configured to disable the display system 100 for 0.5 secs in response to determining the presence of a fault in the image sensor data. This avoids the failure affecting what the user 10 sees on the display and prevents misleading information being presented to the user. Additionally, or alternatively, the controller is configured to check whether it is safe to maintain the automated or advanced driver assistance operation of the vehicle. If it is safe, then maintains the current automated operation of the vehicle. If it is not safe, then the vehicle alerts the user 10 to the need of operational change. The alerts may comprise one or more of: haptic, visual, or auditory feedback. In some examples, the controller may be configured to output a signal indicative of requesting the user 10 to take over the operation of the vehicle upon determining a fault in the image sensor data.

Figure 2:
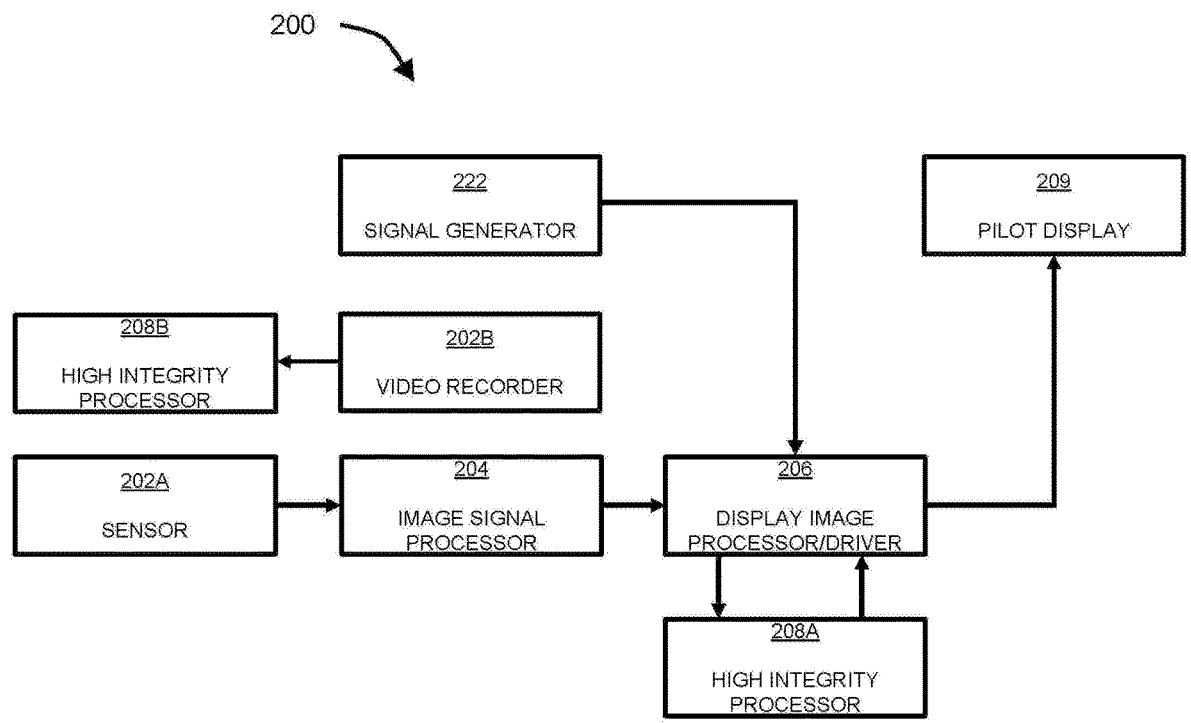
FIG. 2 is a schematic diagram showing a computing system for monitoring integrity of image sensor data.

The controller may be configured to blend at least one of a symbology or a second image sensor data to the image sensor data. The computing system may comprise a signal generator 222 (as illustrated in FIG. 2). The signal generator 222 generates image elements such as symbols and other data which may also be input to the display image processor/driver 106 for display. Symbols may comprise lines and shapes such as triangles, circles, or squares, together with alphanumeric characters or data represented in various ways. The generated symbols would typically be displayed such that they appear to the user 10 to be overlain upon images supplied by the camera 102, when in use. Additionally, or alternatively, the computing system comprises a video recorder 202B or an additional camera for generating a second image sensor data for blending in with the image sensor data. The second image sensor data may be a saved image sensor data that can function as a reference image sensor data. The symbology and the second image sensor data are used for a further reference image sensor data to determine the presence of a fault in the image sensor data. In this way, integrity monitoring and its accuracy can improve further. In such a computing system, failures may occur due to component failures or latent design failures in any one of the components 202A, 202B, 204, 206, 209, 208A, 208B, and 222 leading to a potentially hazardous situation. An integrity monitoring is incorporated to work with the computing system for the purpose of detecting such failures without interfering with the generation of images for use with the computing system. In some examples, the use comprises displaying of the images to the user 10.

FIG. 2 illustrates a schematic diagram showing a computing system 200. The computing system 200 of FIG. 2 may comprise the display system 100 illustrated in FIG. 1. The computing system 200 comprises a sensor 202A, an image signal processor 204, display image processor/driver 206 and pilot display 209. These components correspond to the components of the display system 100 of FIG. 1. The computing system 200 of FIG. 2 illustrates comprises two controllers 208A, 208B. The two controllers 208A, 208B may be configured to concurrently processing the method of integrity monitoring. One of the controllers may be omitted. As described with reference to FIG. 1, the computing system 200 may not comprise the signal generator 222, video recorder 202B and a second controller 208B to process the method for integrity monitoring of the image sensor data. The image sensor may comprise at least one of the controllers 208A and 208B. The computing system 200 comprises the image sensor capable of processing integrity monitoring method. Alternatively, the computing system 200 comprises the image sensor and the controller, wherein the controller is configured to monitor the integrity of the image sensor data and the controller is not integrated into the image sensor. Processing the image sensor data with the controller that is external to the image sensor may reduce the Design Assurance Level of the camera. A vehicle comprises the computing system 200 for monitoring image sensor data integrity.

The controller is configured to determine the presence of a fault in the image sensor data by sampling one or more pixels 304A, 304B of the image sensor data (illustrated in FIG. 3). The controller is configured to compare a grayscale level of the sampled one or more pixels 304A, 304B with the grayscale level of the border 301. The one or more pixels 304A, 304B is selected from the main body 311 of the image sensor data. The main body 311 of the image sensor data comprise a plurality of pixels 304A, 304B. In some examples, the one or more pixels 304A, 304B may comprise the whole pixels in the main body 311 of the image sensor data. In such examples, a certain percentage of pixels are allowed to fail the check. In some examples, the one or more pixels 304A, 304B may be dozens of pixels in the main body 311 of the image sensor data. A small number of pixels at the edge of the main body 311 is sampled for the purpose of determining a line/column gradient. In some examples, the controller may be configured to sample random pixels.

FIG. 3 illustrates a frame 300 of an image sensor data that captures an image 311 (e.g. a scene 111). The image sensor data may be a video image. Although not shown in the figure, the frame comprises of a plurality of pixels 303, 304A, 304B. The pixels 304A, 304B are grouped as a main body 311 of the image sensor data. The main body 311 is displayed to the user 10 in the display system 100. The main body 311 corresponds to the captured image. The captured image corresponds to a field of view of the camera 102. The field of view is constrained, for example, by a lens system of the camera 102. The pixels 303 are grouped to form a border 301. The border 301 is cropped when the image sensor data is displayed. It may be arranged that any light received at the camera 102 from the field of view of an external scene 111 may be sensed by the image sensor of the camera and be displayed. Alternatively, the border 301 and the main body 311 of the image may be displayed.

Additionally, or alternatively, the controller is configured to determine the presence of a fault in the image sensor data by sampling one or more pixels 304A, 304B of the image sensor data (illustrated in FIG. 3) and contrasting the sampled one or more pixels 304A, 304B against pixels against at least one of the plurality of optically dark pixels 303 of the border 301.

Additionally, or alternatively, the controller is configured to sample pixels 304A, 304B by sampling two or more pixels of the image sensor data and sampling at least one adjacent pixel 304B of the sampled two or more pixels 304A. The controller may be configured to sample pixels 304A, 304B by sampling two or more pixels 304A, 304B from the main body 311 (e.g. image) of the image sensor data. The controller may be configured to sample the whole pixels in the main body 311 of the image sensor data. In such case, a certain percentage of pixels are allowed to fail the check. The controller may be configured to sample dozens of pixels in the main body 311 of the image sensor data. The controller may be configured to sample a small number of pixels at the edge of the main body 311. The pixels sampled at the edge of the main body 311 can be used to determine a line/column gradient. The controller is configured to sample one or more pixels 304A, 304B adjacent to the optically dark pixels 303 that forms the border 301.

Figure 4:
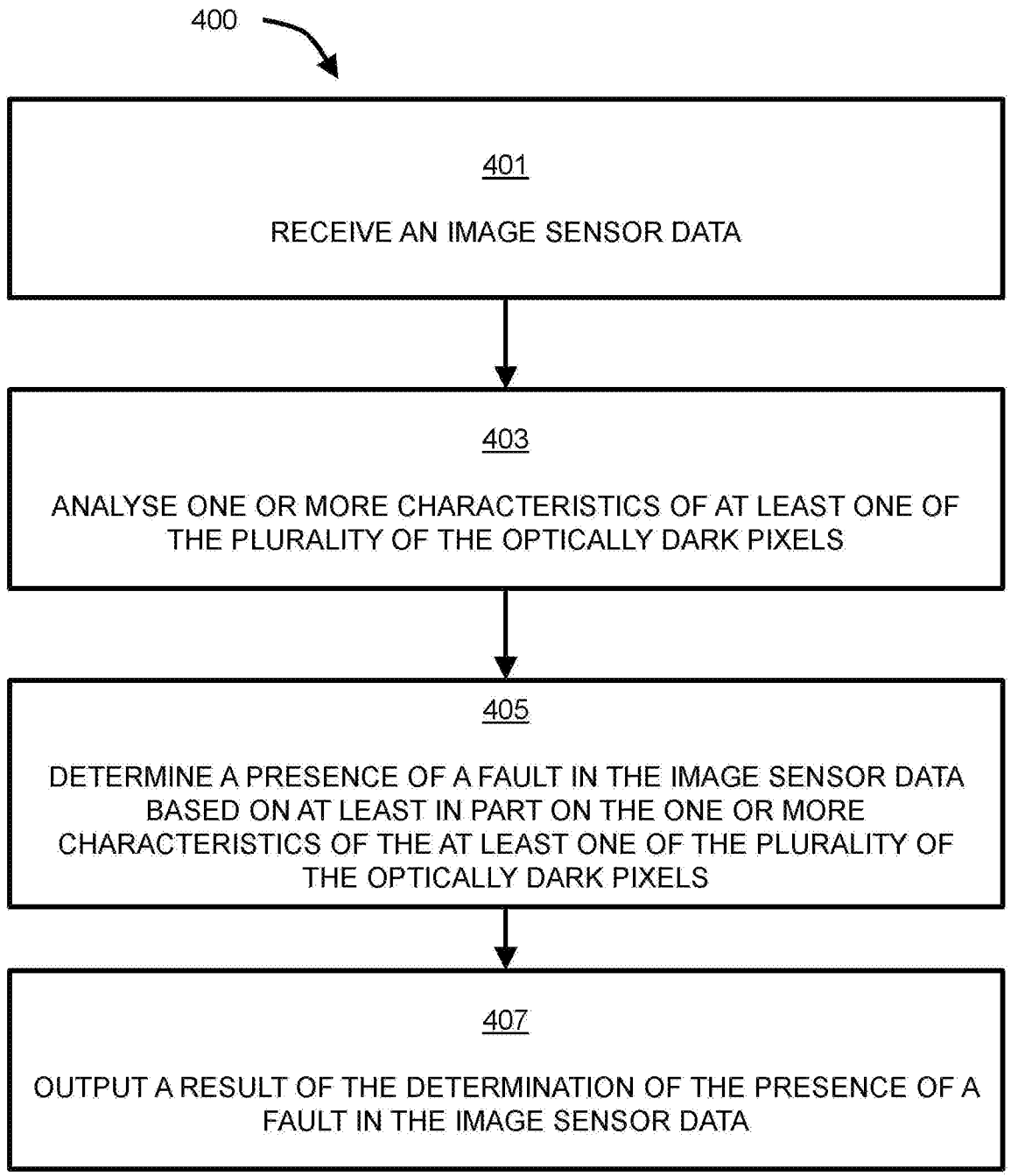
FIG. 4 shows a flow chart of the operational steps monitoring integrity of image sensor data.

FIG. 4 illustrates a flow chart of the operational steps of a method 400 for monitoring integrity of image sensor data. This method 400 may monitor the integrity of an image sensor. The method 400 is described with reference to the display system for a user. However, the method 400 can be carried out in any computing system and hence is not limited to the particular implementations described in this disclosure.

At step 401 image sensor data is received. The image sensor data is received from an image sensor. The image sensor may be any standard image sensor that is used in an image capturing device, such as a camera 102. The image sensor may be a part of specialised image capturing device. For example, the image sensor is a part of a night vision camera. The image sensor may comprise a night vision image sensor. The image sensor data comprises optically dark pixels 303. The optically dark pixels 303 are located around the edge of the sensor. The optically dark pixels 303 are dark reference pixels. At step 403, one or more characteristics of at least one of the plurality of optically dark pixels 303 is analysed. One or more characteristics of the at least one of the plurality of optically dark pixels 303 comprises at least one of: a position of the at least one of the plurality of optically dark pixels or a signal level of at least one of the plurality of optically dark pixels.

At step 405, a presence of a fault in the image sensor data based at least in part on the one or more characteristics of the at least one of the plurality of the optically dark pixels to be output to enable mitigation of the fault is determined. The one or more characteristics of the at least one of the plurality of optically dark pixels 303 comprises at least one of: a position of at least one of the plurality of optically dark pixels 303 a signal level of at least one of the plurality of optically dark pixels 303. The image sensor data may comprise one or more frames 300. A frame may be selected within a predetermined period of time, such as 20 ms.

The one or more characteristics of the at least one of the plurality of optically dark pixels 303 may comprise a signal level and the determining of a presence of a fault in the image sensor data comprises comparing the signal level of the at least one of the plurality of optically dark pixels 303 with a signal level of one or more of the pixels 304A, 304B of the image 311. Additionally, or alternatively, the one or more characteristics of the at least one of the plurality of optically dark pixels 303 may comprise a position of the at least one of the plurality of optically dark pixels 303, and the determining of a presence of a fault in the image sensor data comprises comparing a position of the at least one of the plurality of optically dark pixels 303 of a first frame of the image sensor data with a position of the at least one of the plurality of optically dark pixels 303 of a second frame of the image sensor data.

A border 301 is formed from the plurality of optically dark pixels. One or more characteristics of the border 301 is analysed and the presence of a fault in the image sensor data based at least in part on the one or more characteristics of the border to be output to enable mitigation of the fault is determined. The border 301 may be recognised at step 401, upon receipt of the image sensor data. Alternatively, the border 301 may be formed at or prior to step 403. The analysis of the one or more characteristics of the border 301 may be carried out at step 403 or as a separate step after the formation or recognition of the border 301. The one or more characteristics of the border 301 may comprise the one or more characteristics of the at least one of the optically dark pixels 303. Alternatively, the one or more characteristics of the at least one of the optically dark pixels 303 may include the information about the border 301.

One or more characteristics of the border 301 comprises at least one of: a position of the border, a size of the border or one or more signal levels in the border.

At step 405, a presence of a fault in the image sensor data that may be based on at least in part on the one or more characteristics of the border 301 is determined. The one or more characteristics of the border may comprise one or more signal levels and the determining of a presence of a fault in the image sensor data further comparing the one or more signal levels of the border with one or more signal levels of the image 311. Additionally, or alternatively, the one or more characteristics of the border 301 comprises a position of the border and the determining of a presence of a fault in the image sensor data further comprises comparing a position of the border of a first frame of the image sensor data with a position of the border of a second frame of the image sensor data. Additionally, or alternatively, the one or more characteristics of the border 301 comprises a size of the border, and the determining of a presence of a fault in the image sensor data further comprises comparing a size of the border of a first frame of the image sensor data with a size of the border of a second frame of the image sensor data.

Optionally, a result of the determination of the presence of a fault in the image sensor data is output (Step 407). If an acceptable and/or tolerable level of the fault in the image sensor data is determined then, in response, the image sensor data is outputted. If an absence of a fault in the image data is determined then, in response, the image data is outputted. For example, the image sensor data is displayed via a display system, without the plurality of optically dark pixels 303 to a user 10. Alternatively, the image sensor data is displayed via a display system, with the plurality of optically dark pixels 303 to a user 10. The displayed plurality of optically dark pixels 303 can provide an extra integrity mechanism for the user 10. In this way, the controller allows that the user is displayed with a verification image. This may be an alternatively to inserting a specific test pattern (e.g. placing a cross or something similar in one corner of the image) into the image earlier in the processing pathway that is then made visible to the user 10 so that the user can check whether the image sensor data (e.g. video stream) is being transmitted correctly. The image (e.g. a main body 311 of the pixels that forms the image sensor data) is displayed. The image sensor data being displayed may comprise the main body 311 and the border 301.

If the presence of a fault in the image sensor data is determined then, in response, an action to mitigate the fault is performed. The action comprises one or more of: disregarding the image sensor data, providing a replacement image sensor data, delaying the displaying of the image sensor data, maintaining current operation of the vehicle, alerting the fault in the system to the user and/or the systems of the vehicle. The action of alerting the fault in the system to the user may comprise blanking of the display with a warning message or flagging up the issue to the user to address faulty image sensor data. The action may last for a predetermined period of time.

Determining the presence of a fault in the image sensor data may comprise sampling one or more pixels 304A, 304B of the image sensor data. A grayscale level of the sampled one or more pixels 304A, 304B is compared with the grayscale level of the at least one of the plurality of optically dark pixels 303. border 301. If a border 301 is recognised or formed, a grayscale level of the sampled one or more pixels 304A, 304B is compared with the grayscale level of at least one of the plurality of optically dark pixels 303 of the border 301. The grayscale level of the at least one of the plurality of optically dark pixels 303 may be the same. Additionally, or alternatively, the sampled one or more pixels 304A, 304B is contrasted against at least one of the plurality of optically dark pixels 303. If a border 301 is recognised or formed, a grayscale level of the sampled one or more pixels 304A, 304B is contrasted against the grayscale level of the at least one of the plurality of optically dark pixels 303 of the border 301

Sampling pixels may comprise sampling two or more pixels 304A, 304B of the image sensor data. The sampling may comprise selecting at least one adjacent pixel of the sampled two or more pixels 304A, 304B. The sampled pixels 304 may be from the main body 311 (e.g. image) of the image sensor data.

A further reference pixel may be incorporated into the image sensor data. For example, at least one of a symbology or a second image sensor data may be blended into the image sensor data. The controller is configured to insert the reference pixel into the image sensor data earlier in the processing pathway, and then made visible to the user 10 so that the user 10 can check whether the image sensor data (e.g. video stream) is being transmitted correctly. This step enhances the integrity monitoring. The reference pixel may comprise one or more pixels. The one or more pixels may form a pattern. In some examples, the pattern of the reference pixels that is controlled dynamically by the controller may be inserted into the image sensor data. For example, the pattern may be formed as a cross and placed in one corner of the image. The reference pixels may replace a few of the optically dark pixels. The replacement occurs immediately after the optically dark pixels are extracted from the image sensor. In this way, it is possible to have a high integrity check that is independent of the camera and allows straight forward verification of whether the inserted reference pixels (such as the pattern) are outputted. This allows that the camera can be developed separately and with lower integrity development requirement for it and in a more cost-effective manner.

A 'frozen display' occurs when the display fails to refresh and so display incorrect images such as changing image content. The controller is configured to analyse value of the at least one of the plurality of optically dark pixels to check whether there are changes as the values may be affected by noise. Any pixel of the image sensor data may be used for this purpose. For example, the same pixel in two or more frames may be checked to determine whether its value is changing. In some examples, the controller is configured to analyse one or more pixels from within the active region of the image sensor to determine the faults in a whole or partial region that creates frozen effect. This ensures that the display system displays correct image data within a predetermined time period. The predetermined time may be within two display frame periods of 20 ms. A shorter period may be set if the integrity system is synchronised to the frame periods of the display system. In some examples, the predetermined time may be set depending on the nature of reporting failures. This ensures flexibility in the integrity system by allowing additional time in the system if required.

Image scaling errors may cause the display of an image of the external scene 111 at a size that is different to usual size such that the image of the first frame appear significantly misplaced to the image of the second frame. The controller may detect an image scaling error by detecting light levels or other characteristic expected from correctly positioned borders. Incorrectly positioned pixels will result in a different sensed light level or characteristic at each position as compared with that of correctly positioned pixels.

Image oscillation may be characterised by united oscillatory changes in pixel brightness (on/off), greyscale level, pixel colour or position. Any of these symptoms may be detected by the controller by analysing the sensed characteristics of light detected at the same positions of respective frames of the image sensor data. The position, colour, and brightness over a time period of several frame periods e.g. of 20 ms, enable evidence of image oscillation to be detected.

Positioning errors are characterised by the display of image elements in unintended positions. As for the detection of scaling errors, sensed differences in the characteristics of light at the positions expected at a display for correctly positioned images provide evidence of positioning errors.

Image brightness faults may be characterised by absolute brightness errors or relative brightness errors arising in different parts of the image area of the display. Image brightness errors may be detected by comparing the detected display brightness or relative brightness in an image formed at the screen, with that or those expected.

The set of instructions described above may be embedded in a computer-readable storage medium (e.g., a non-transitory computer-readable storage medium) that may comprise any mechanism for storing information in a form readable by a machine or electronic processors/computational device, including, without limitation: a magnetic storage medium (e.g., floppy diskette); optical storage medium (e.g., CD-ROM); magneto optical storage medium; read only memory (ROM); random access memory (RAM); erasable programmable memory (e.g., EPROM or EEPROM); flash memory; or electrical or other types of medium for storing such information/instructions.

Although the present invention has been described in connection with some embodiments, it is not intended to be limited to the specific form set forth herein. Rather, the scope of the present invention is limited only by the accompanying claims. Additionally, although a feature may appear to be described in connection with particular embodiments, one skilled in the art would recognize that various features of the described embodiments may be combined in accordance with the invention. In the claims, the term 'comprising' does not exclude the presence of other elements or steps.

Furthermore, the order of features in the claims does not imply any specific order in which the features must be performed and in particular the order of individual steps in a method claim does not imply that the steps must be performed in this order. Rather, the steps may be performed in any suitable order. In addition, singular references do not exclude a plurality. Thus, references to 'a', 'an', 'first', 'second', etc. do not preclude a plurality. In the claims, the term 'comprising' or "including" does not exclude the presence of other elements.

The invention claimed is:

1. An integrity monitor for monitoring integrity of image sensor data, the integrity monitor comprising:
    an image sensor configured to generate image sensor data, wherein the image sensor data includes an image representative of a scene and a plurality of optically dark pixels in a predetermined position relative to the image; and
    a controller configured to
        analyse one or more characteristics of at least one of the plurality of optically dark pixels of the image sensor data, and
        determine a presence of a fault in the image sensor data based at least in part on the one or more characteristics of the at least one of the plurality of the optically dark pixels to be output to enable mitigation of the fault;
    wherein the one or more characteristics of the at least one of the plurality of optically dark pixels comprises
        (i) a position of the at least one of the plurality of optically dark pixels at a first frame relative to a position of the at least one of the plurality of optically dark pixels at a second frame, or
        (ii) a noise signal level of the at least one of the plurality of optically dark pixels at the first frame relative to a noise signal level of the at least one of the plurality of optically dark pixels at the second frame, or
        (iii) both (i) and (ii).

2. The integrity monitor of claim 1, wherein the controller is further configured to:
    output a result of the determination of the presence of a fault in the image sensor data.

3. The integrity monitor of claim 1, wherein the controller is further configured to:
    output the image sensor data, in response to determining that the presence of a fault in the image sensor data is at an acceptable level.

4. The integrity monitor of claim 1, further comprising a display configured to display the image sensor data with the plurality of optically dark pixels to a user so that the user is provided with a verification image.

5. The integrity monitor of claim 1, wherein the controller is configured to output a signal to cause or to perform an action to mitigate the fault in response to the determination of the presence of a fault in the image sensor data.

6. The integrity monitor of claim 5, wherein the action comprises one or more of:
    disregarding the image sensor data;
    providing a replacement image sensor data;
    delaying the displaying of the image sensor data;
    maintaining current operation of a vehicle; and
    alerting the fault in a system to the user and/or systems of the vehicle.

7. The integrity monitor of claim 1, wherein the controller is configured to blend at least one of a symbology or a second image sensor data to the image sensor data.

8. The integrity monitor of claim 1, wherein the controller is further configured to:
    sample one or more pixels of the image sensor data; and
    further configured to perform at least one of
        comparing a grayscale level of the sampled one or more pixels with a grayscale level of at least one of the plurality of optically dark pixels, or
        contrasting the sampled one or more pixels against at least one of the plurality of optically dark pixels.

9. The integrity monitor of claim 1, wherein the controller is configured to:

determine a border formed of the plurality of optically dark pixels; and further configured to analyse one or more characteristics of the border; and determine the presence of a fault in the image sensor data based at least in part on the one or more characteristics of the border to be output to enable mitigation of the fault.

10. The integrity monitor of claim 9, wherein the one or more characteristics of the border comprises at least one of: a position of the border, a size of the border, or one or more signal levels in the border.

11. A method for monitoring integrity of image sensor data, the method comprising:

receiving image sensor data, wherein the image sensor data includes an image representative of a scene and a plurality of optically dark pixels in a predetermined position relative to the image;

analysing one or more characteristics of at least one of the plurality of optically dark pixels; and determining a presence of a fault in the image sensor data based at least in part on the one or more characteristics of the at least one of the plurality of the optically dark pixels to be output to enable mitigation of the fault, wherein the one or more characteristics of the at least one of the plurality of pixels comprises (i) a position of the at least one of the plurality of optically dark pixels at a first frame relative to a position of the at least one of the plurality of optically dark pixels at a second frame, or (ii) a noise signal level of the at least one of the plurality of optically dark pixels at the first frame relative to a noise signal level of the at least one of the plurality of optically dark pixels at the second frame, or (iii) both (i) and (ii).

12. The method of claim 11, further comprising:

outputting a result of the determination of the presence of a fault in the image sensor data.

13. The method of claim 12, further comprising:

outputting the image sensor data, in response to determining that the presence of a fault in the image sensor data is at an acceptable level; and/or performing an action to mitigate the fault in response to the determination of the presence of a fault in the image sensor data.

14. A vehicle comprising the integrity monitor of claim 1.

15. A controller configured to:

receive image sensor data, wherein the image sensor data includes an image representative of a scene and a plurality of optically dark pixels in a predetermined position relative to the image;

analyse one or more characteristics of at least one of the plurality of optically dark pixels of the image sensor data, wherein the one or more characteristics of the at least one of the plurality of optically dark pixels comprises (i) a position of the at least one of the plurality of optically dark pixels at a first frame relative to a position of the at least one of the plurality of optically dark pixels at a second frame, or (ii) a noise signal level of the at least one of the plurality of optically dark pixels at the first frame relative to a noise signal level of the at least one of the plurality of optically dark pixels at the second frame, or (iii) both (i) and (ii);

determine a presence of a fault in the image sensor data based at least in part on the one or more characteristics of the at least one of the plurality of the optically dark pixels; and cause or perform an action to mitigate the fault, responsive to the determination of the presence of the fault in the image sensor data.

16. The controller of claim 15, wherein the action comprises one or more of:

disregarding the image sensor data;

providing a replacement image sensor data;

delaying the displaying of the image sensor data;

maintaining current operation of a vehicle; and alerting the fault in a system to the user and/or systems of the vehicle.

17. The controller of claim 15, wherein the controller is configured to output the image sensor data, responsive to determining that the presence of the fault in the image sensor data is at an acceptable level.

18. The controller of claim 15, wherein the controller is configured to sample one or more pixels of the image sensor data, and to perform at least one of:

comparing a grayscale level of the sampled one or more pixels with a grayscale level of at least one of the plurality of optically dark pixels; or contrasting the sampled one or more pixels against at least one of the plurality of optically dark pixels.

19. The controller of claim 15, wherein the controller is configured to:

determine a border formed of the plurality of optically dark pixels;

analyse one or more characteristics of the border; and determine the presence of a fault in the image sensor data based at least in part on the one or more characteristics of the border to be output to enable mitigation of the fault;

wherein the one or more characteristics of the border comprises at least one of a position of the border, a size of the border, or one or more signal levels in the border.

* * * * *